May 7, 1974  KENJI HIGASHIYAMA ET AL  3,809,638
DEVICE FOR MEARURING AN ACTIVITY OF MANGANOUS IONS
Filed Feb. 28, 1972

3,809,638
DEVICE FOR MEASURING AN ACTIVITY OF
MANGANOUS IONS
Kenji Higashiyama and Hiroshi Hirata, Osaka, Japan, assignors to Matsushita Electric Industrial Co., Ltd., Osaka, Japan
Filed Feb. 28, 1972, Ser. No. 229,914
Claims priority, application Japan, Mar. 2, 1971, 46/11,124, 46/11,125; Mar. 3, 1971, 46/11,408, 46/11,409
Int. Cl. G01n 27/46
U.S. Cl. 204—195 M    6 Claims

ABSTRACT OF THE DISCLOSURE

A device for measuring an activity of manganous ions comprises a selective electrode and a reference electrode immersed in a solution containing manganous ions, said selective electrode including a disc in a batch composition which comprises a combination of manganous chalcogenide and silver telluride or in a batch composition which comprises a combination of manganous telluride and at least one member selected from the group consisting of silver sulfide, silver selenide and silver telluride.

BACKGROUND OF THE INVENTION

The invention relates to a device for measuring an activity of manganous ions and more particularly to a device comprising a selective electrode responsive to the activity of manganous ions and a reference electrode.

Manganous ion activity can be determined by several methods such as chelatometric titration, spectrophotography and polarography. However, these methods generally require troublesome pretreatment for the sample before the measurement of manganous ions.

It is desirable for chemical industry to have a device for measuring the activity of manganous ions in a solution without any pretreatment of the solution to be tested.

An object of this invention is to provide a device for measuring directly the activity of manganous ions in a solution.

A further object of this invention is to provide such a measuring device characterized by a high sensitivity to manganous ions.

Another object of this invention is to provide a manganous ion measuring device characterized by a high response to the manganous ions.

These and other objects of this invention will be apparent upon consideration of the following detailed description taken together with accompanying drawings.

A device for measuring an activity of manganous ions according to the present invention comprises a selective electrode and a reference electrode immersed in a solution containing manganous ions, whereby only another surface contacts with said solution. Said manganous ion-selective electrode includes a disc which is in a batch composition comprising a combination of manganous chalcogenide and silver telluride or in a batch composition comprising a combination of manganous telluride and at least one member selected from the group consisting of silver sulfide, silver selenide and silver telluride. Said batch composition according to the present invention achieves a manganous ion-selective electrode having a high sensitivity and a wide application range with pH value in a solution to be tested.

Figure 1:
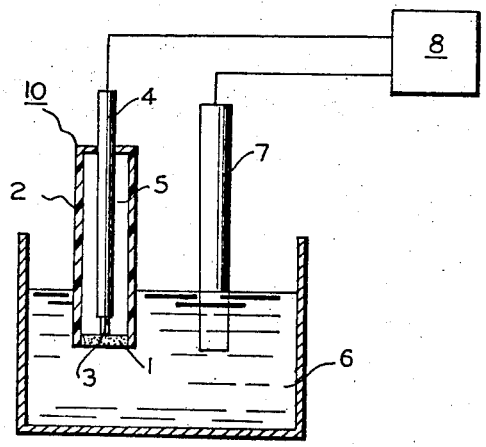
FIG. 1 is a schematic diagram of a device for measuring manganous ions in a solution in accordance with the invention.

Referring to FIG. 1, reference character 10 designates, as a whole, a selective electrode which comprises a disc in a batch composition according to the present invention. Said lead 3 is enveloped by a sealed wire 4. A combination of said disc 1 and said lead 3 partly enveloped by said sealed wire 4 is enclosed in a housing 2 so that another surface of said disc 1 contacts with a solution 6. Said housing 2 is filled with an insulating resinous materials 5. A reference electrode 7 partly immersed in said solution 6 is electrically connected to one terminal of a voltmeter 8 having a high impedance. Said lead 3 is electrically connected to another terminal of said voltmeter 8.

A variation in the logarithm of the activity of manganous ions in said solution 6 has a substantially linear relation to the variation in the potential between said selective electrode 10 and said reference electrode 7, both being partly immersed in said solution 6. One can use any available and suitable electrode such as a saturated calomel electrode or a silver-silver chloride electrode as said reference electrode 7.

Said disc is in a batch composition comprising a combination of 5–50 wt. percent of manganous chalcogenide and 50–95 wt. percent of silver telluride or in a batch composition comprising a combination of 5–50 wt. percent of manganous telluride and 50–95 wt. percent of at least one member selected from the group consisting of silver telluride, silver selenide and silver sulfide in accordance with the invention.

A batch composition comprising a combination of more than 50 wt. percent of manganous chalcogenide and less than 50 wt. percent of silver telluride results in a low sensitivity of resultant electrode and in a unstable potential which is sensitive to the presence of static charges. A batch composition comprising a combination of less than 5 wt. percent of manganous telluride and more than 95 wt. percent of silver chalcogenide results in a low sensitivity and a long response time of resultant electrode.

Manganous chalcogenide referred to herein is defined as manganous sulfide, manganous selenide and mnagaous telluride.

A batch composition referred to herein is defined as a composition of starting materials before heating.

A better result is obtained by using a batch composition wherein silver sulfide includes at least one member selected from the group consisting of silver selenide and silver telluride, the weight ratio of said silver sulfide to one member being in a range from 1 to 10. This batch composition results in a high sensitivity and a short response time of resultant electrode.

A more preferable composition comprises a combination consisting essentially of 10 to 30 wt. percent of manganous telluride and 70 to 90 wt. percent of silver sulfide.

Figure 2:
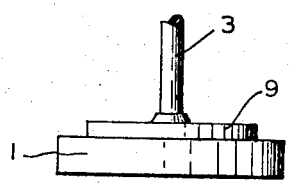
FIG. 2 is a cross sectional view of a disc for use in the device of FIG. 1.

A longer operation life can be obtained by providing said disc with a noble metal such as gold, palladium or platinum electrode. Referring to FIG. 2, a disc 1 has a noble metal electrically connected to said noble metal electrode 9 by any available and suitable method such as soldering. Said noble metal electrode 9 can be prepared by, for example, vacuum-depositing of a noble metal film or by applying an available commercially noble metal paint.

The disc for use in said selective electrode can be obtained by heating a pressed body of a mixture of a given composition in a non-oxidizing atmosphere in accordance with a conventional ceramic method.

A mixture of starting materials of a fine powder form in a given batch composition according to the present invention is mixed well in a dry method by any suitable and available equipment and is pressed into a disc in a desired form at a pressure of 100 to 20,000 kg./cm.² The pressed disc is heated at a temperature of 100° C.

to 600° C. for time period of 1 to 10 hours preferably in a non-oxidizing atmosphere, such as nitrogen or argon.

The device according to the invention can be reliably used at temperatures from 0° to 95° C. The measured potential versus the logarithm of the acivity of manganous ions is substantially linear relation.

Many kinds of diverse ions such as sodium, potassium, calcium, magnesium, nickel, cobalt, aluminum, zinc, chloride, sulfate, nitrate and perchlorate ions are tolerated and may coexist during the measurement of the activity of the manganous ions. However, silver, cupric, lead, ferric, mercuric, iodide and sulfide ions should be removed from the solution to be measured.

Example 1

A mixture of 25 wt. percent of manganous telluride and 75 wt. percent of silver sulfide is mixed well in a dry method and is pressed at a pressure of 10,000–20,000 kg./cm.$^2$ into a disc 15 mm. diameter and having a 3 mm. thickness. The pressed disc is heated at 400° C. for 2 hours in purified nitrogen gas stream having a flow rate of 0.2 l./min. The sintered disc is polished, at both surfaces with silicon carbide abrasive and then with diamond paste into a thickness of 2 mm. The polished disc is provided, at one surface, with a gold electrode which is obtained from Du Pont gold paint #8115. The polished disc is connected, at the gold electrode, to a lead partly enveloped by a sealed wire and is mounted in a housing of polyvinyl chloride resin. The housing is filled with epoxy resin so as to build up a selective electrode and a saturated calomel electrode as reference electrode is immersed in an aqueous solution of pure manganous nitrate at 25° C. The potential between the selective electrode and the calomel electrode is measured by a voltmeter for use in a pH meter.

The device measures the activity of manganous ions with a high sensitivity as shown in Table 1.

TABLE 1

| Activity of manganous ions, M: | Potential, mv. |
|---|---|
| $10^{-1}$ | −17 |
| $10^{-2}$ | −43 |
| $10^{-3}$ | −71 |
| $10^{-4}$ | −100 |
| $10^{-5}$ | −129 |
| $10^{-6}$ | −148 |

Example 2

A device for measuring the activity of manganous ions is prepared in a manner similar to that of Example 1. A disc of Example 2 includes manganous sulfide and silver telluride. The preparation of the disc is similar to that of Example 1. The potential between the selective electrode and a calomel electrode in an aqueous solution of pure manganous nitrate is measured with the same procedure described in Example 1. The device measures the activity of manganous ions with a high sensitivity as shown in Table 2.

TABLE 2

| Activity of manganous ions, M | Potential, mv. | | | |
|---|---|---|---|---|
| | 1:99* | 5:95* | 25:75* | 50:50* |
| $10^{-1}$ | −55 | −49 | −55 | −40 |
| $10^{-2}$ | −53 | −59 | −75 | −65 |
| $10^{-3}$ | −53 | −71 | −98 | −91 |
| $10^{-4}$ | −53 | −85 | −119 | −129 |
| $10^{-5}$ | | −101 | −145 | −157 |
| $10^{-6}$ | | −105 | −153 | −168 |

*Weight ratio of manganous sulfide:silver telluride.

Example 3

The device for measuring the activty of manganous ions is prepared in a manner similar to that of Example 1. A disc of Example 3 includes manganous telluride and silver selenide. The preparation of the disc is similar to that of Example 1. The potential between the selective electrode and a saturated calomel electrode in an aqueous solution of pure manganous nitrate is measured by the same procedure described in Example 1. The device measures the activity of manganous ions with a high sensitivity as shown in Table 3.

TABLE 3

| Activity of manganous ions, M | Potential, mv. | | | |
|---|---|---|---|---|
| | 1:99* | 5:95* | 25:75* | 50:50* |
| $10^{-1}$ | −27 | −28 | −25 | −13 |
| $10^{-2}$ | −29 | −37 | −46 | −35 |
| $10^{-3}$ | −28 | −47 | −67 | −53 |
| $10^{-4}$ | | −58 | −89 | −73 |
| $10^{-5}$ | | −65 | −113 | −76 |
| $10^{-6}$ | | −68 | −133 | −89 |

*Weight ratio of manganous telluride:silver selenide.

Example 4

A device for measuring the activity of manganous ions is prepared in a manner similar to that of Example 1. A disc of Example 4 includes 25 wt. percent of manganous telluride, 15 wt. percent of manganous selenide and 60 wt. percent of silver sulfide. The preparation of the disc is similar to that of Example 1. The potential between the selective electrode and a saturated calomel electrode in an aqueous solution of pure manganous nitrate is measured with the same procedure described in Example 1. The device measures the activity of manganous ions with a high sensitivity as shown in Table 4.

TABLE 4

| Activity of manganous ions, M: | Potential, mv. |
|---|---|
| $10^{-1}$ | −38 |
| $10^{-2}$ | −62 |
| $10^{-3}$ | −89 |
| $10^{-4}$ | −118 |
| $10^{-5}$ | −146 |
| $10^{-6}$ | −166 |

EXAMPLE 5

A device for measuring the activity of maganous ions is prepared in a manner similar to that of Example 1. A disc of Example 5 includes 5 wt. percent of manganous selenide, 25 wt. percent of manganous telluride, 20 wt. percent of silver selenide and 50 wt. percent of silver sulfide as the starting materials. The preparation of the disc is similar to that of Example 1. The potential between the selective electrode and a saturated calomel electrode in an aqueous solution of pure manganous nitrate is measured with the same procedure described in Example 1. The device measures the activity of manganous ions with a high response as shown in Table 5.

TABLE 5

| Activity of manganous ions, M: | Potential, mv. |
|---|---|
| $10^{-1}$ | −14 |
| $10^{-2}$ | −37 |
| $10^{-3}$ | −64 |
| $10^{-4}$ | −92 |
| $10^{-5}$ | −119 |
| $10^{-6}$ | −131 |

What is claimed is:

1. A device for measuring the activity of manganous ions, comprising a selective electrode and a reference electrode which are coupled through a potential measuring apparatus, said selective electrode including a disc which in a batch composition comprises a combination of manganous chalcogenide and silver telluride.

2. A device for measuring the activity of manganous ions as defined in claim 1, wherein said batch composition comprises a combination of 5–50 wt. percent of manganous chalcogenide and 50–95 wt. percent of silver telluride.

3. A device for measuring the activity of manganous ions as defined in claim 2, wherein said manganous chalcogenide is at least one member selected from the group consisting of manganous sulfide, manganous selenide and manganous telluride.

4. A device for measuring the activity of manganous ions, comprising a selective electrode and a reference electrode which are coupled through a potential measuring apparatus, said selective electrode including a disc which in a batch composition comprises a combination of manganous telluride and at least one member selected from the group consisting of silver sulfide, silver selenide and silver telluride.

5. A device for measuring the activity of manganous ions as defined in claim 4, wherein said batch composition comprises a combination of 5–50 wt. percent of manganous telluride and 50–95 wt. percent of at least one member selected from the group consisting of silver sulfide, silver selenide and silver telluride.

6. A device for measuring the activity of manganous ions as defined in claim 4, wherein said combination is 10–30 wt. percent of manganous telluride and 70–90 wt. percent of silver sulfide.

References Cited

UNITED STATES PATENTS

| 3,591,464 | 7/1971 | Frant et al. | 204—1 T |
| 3,669,862 | 6/1972 | Hirata et al. | 204—195 M |

TA-HSUNG TUNG, Primary Examiner

U.S. Cl. X.R.

204—1 T